United States Patent [19]
Horton et al.

[11] 3,826,585
[45] July 30, 1974

[54] DUAL HEAD DRILL DEVICE

[75] Inventors: Ray E. Horton, Hawthorne; Ernest S. Harris, Inglewood; Granville P. Leffel, South San Gabriel, all of Calif.

[73] Assignee: Northrop Corporation, Los Angeles, Calif.

[22] Filed: Aug. 13, 1973

[21] Appl. No.: 387,897

[52] U.S. Cl. ................ 408/41, 408/117, 408/130, 408/702, 173/52
[51] Int. Cl. ............................................. B23b 45/04
[58] Field of Search .......... 408/41, 40, 39, 37, 130, 408/129, 702, 110, 117; 173/52

[56] References Cited
UNITED STATES PATENTS

| | | |
|---|---|---|
| 1,978,878 | 10/1934 | Ferris et al............................ 408/81 |
| 2,909,949 | 10/1959 | Winslow ............................ 408/702 |

Primary Examiner—Gil Weidenfeld
Attorney, Agent, or Firm—William W. Rundle

[57] ABSTRACT

A hand-held air operated dual head drilling device adapted to automatically and simultaneously drill holes in a part from opposite sides thereof. An air operated mechanism is contained in the center section including a master cylinder, two opposed slave pistons in the cylinder and fixed to the drill motor heads, and dual triggers for operating the drill motors and slave pistons respectively.

8 Claims, 7 Drawing Figures

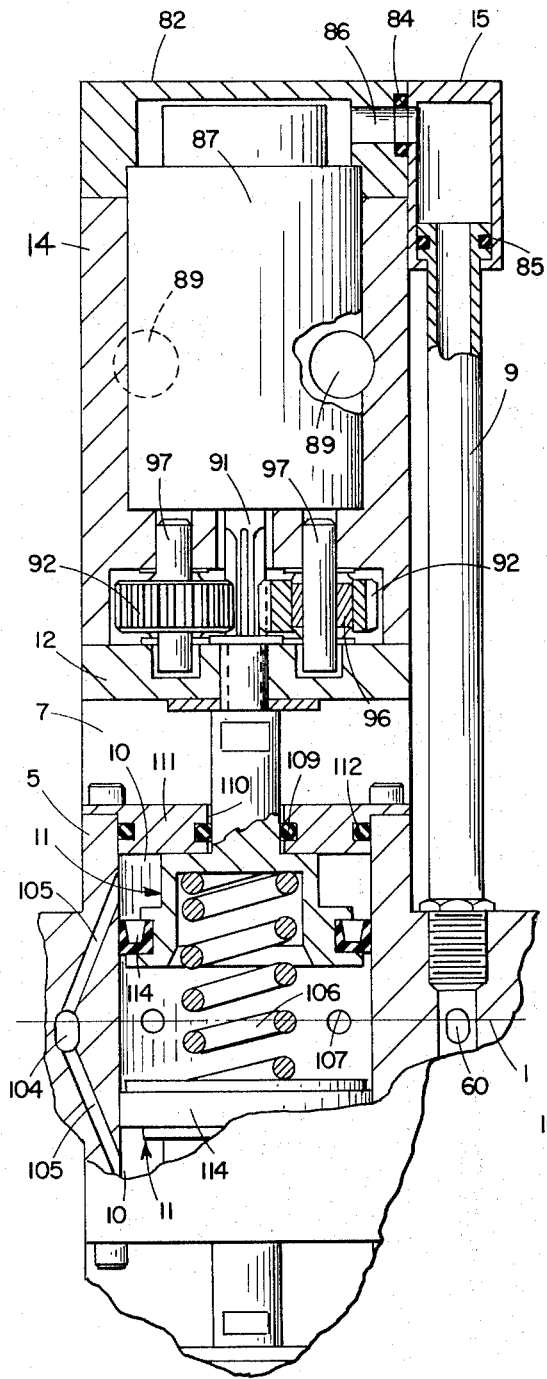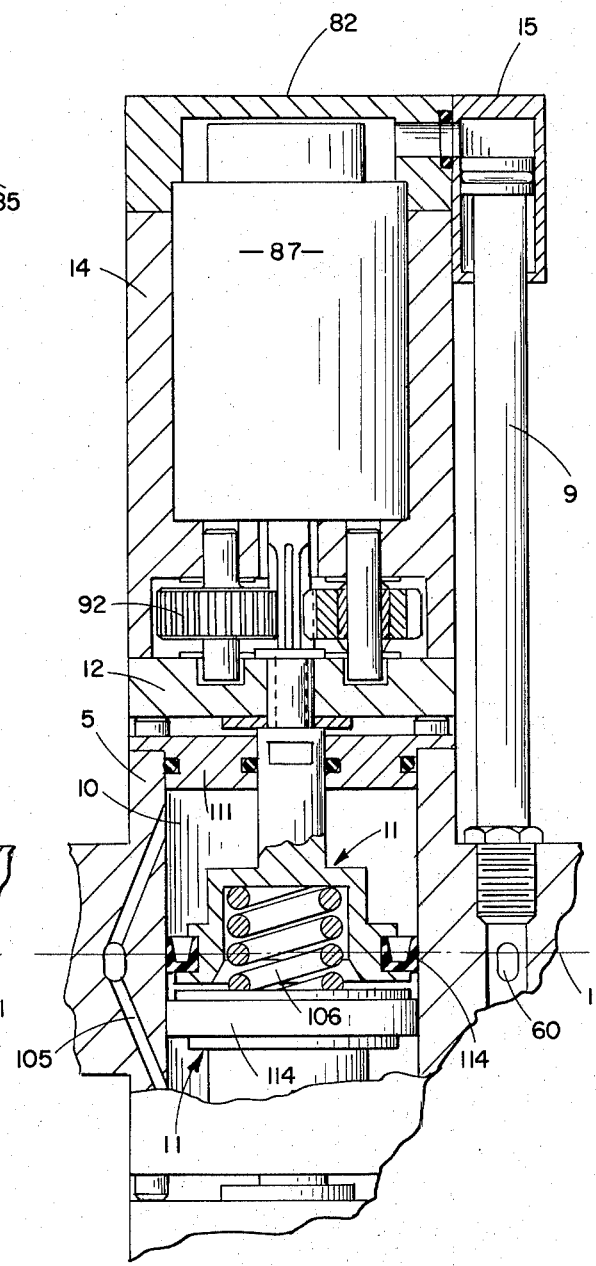

DUAL HEAD DRILL DEVICE

The present invention relates to hand-held drilling devices and more particularly to a dual opposed head drilling tool automatically controlled by manually operated means to simultaneously drill holes in a workpiece from opposite directions thereof. Prior-art drilling tools incorporating more than two drill spindles are large and not capable of being hand-held. Also they are capable of drilling holes in only one direction through a workpiece. When the workpiece has spaced flanges or other parallel surfaces, in both of which holes are required, one side or surface is required to be drilled first and then the workpiece turned over for drilling of the other surface. This drilling procedure required not only the rotation of the workpiece, but a complete layout of hole locations on each side of the workpiece.

It is an object of the present invention to provide a drilling means by which two spaced surfaces of a workpiece can be drilled simultaneously. Another object is to provide a portable hand-held drilling tool adapted for drilling holes simultaneously from opposite sides of a workpiece having spaced surfaces.

Another object is to provide a drilling tool that will automatically advance and retract drills from opposite sides of a workpiece having spaced surfaces by a control means responsive to manual actuating means.

A further object is to provide a drilling tool having handles pivotally adjustable to the desired position of the operator.

A further object is to provide a drilling tool which can rotate relative to the longest axis of workpiece and can be locked in a required alignment relative to the workpiece.

Other objects of the invention will become apparent from the following detailed description, taken in conjunction with the drawings in which:

FIG. 3 is a detail sectional view, partly cut away, taken in accordance with broken line 3—3 of FIG. 1, showing a drill motor in its retracted position.

FIG. 4 is a view similar to FIG. 3 showing the drill motor in an advanced position.

Figure 7:
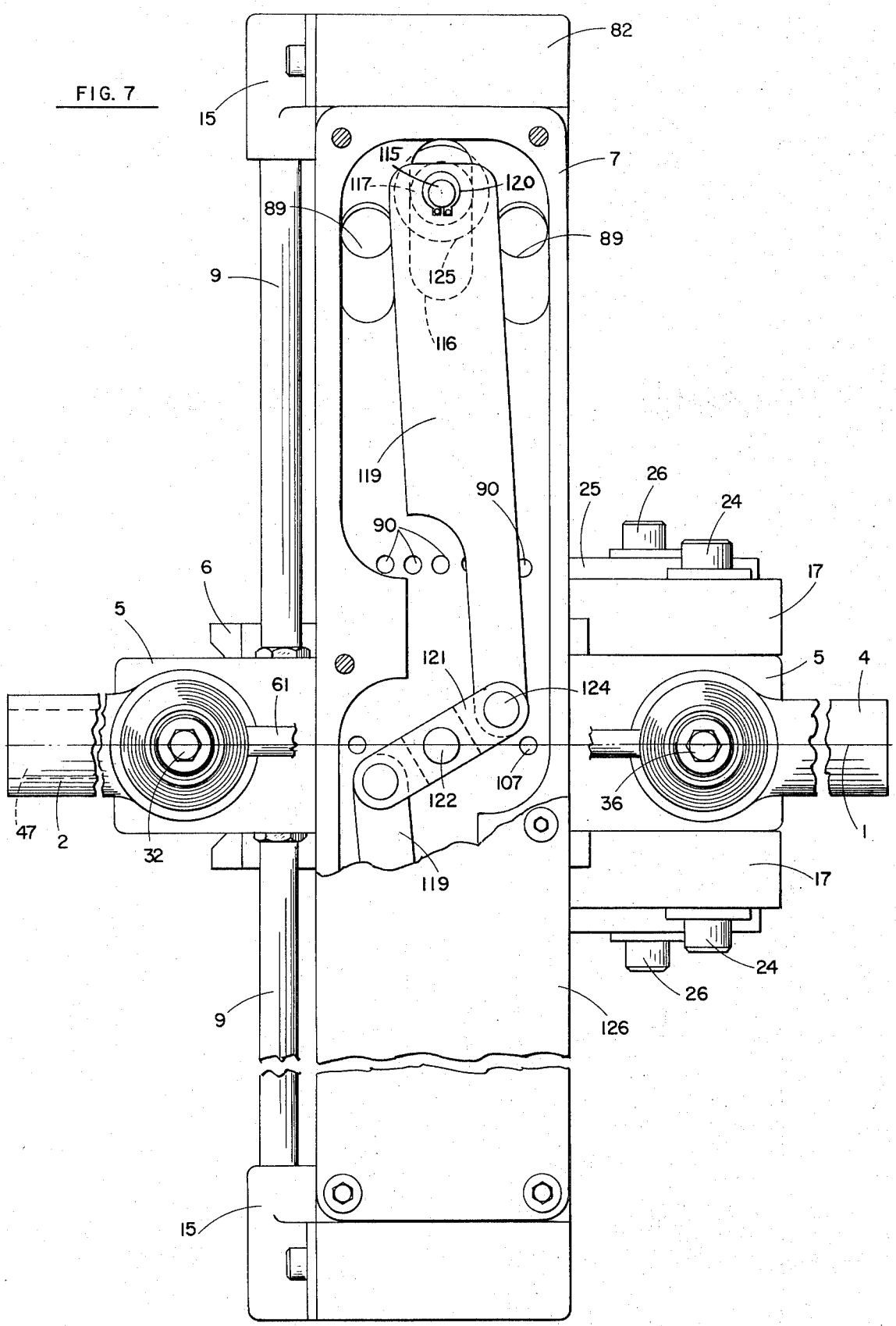
FIG. 7 is a back elevation view, partly cut away, of the tool of FIG. 1.

As shown in FIG. 7, the present drilling tool is symmetrical about a horizontal center line 1 through a drill speed control handle 2 and a feed control handle 4. The drilling tool comprises the following: a center section 5 to which are pivotally attached the drill speed control handle 2, the feed control handle 4 and a saddle 6, as further shown in FIGS. 1 and 2. An adapter plate 7 and two motor drive air tubes 9 are threadably attached to the center section 5.

Figure 1:
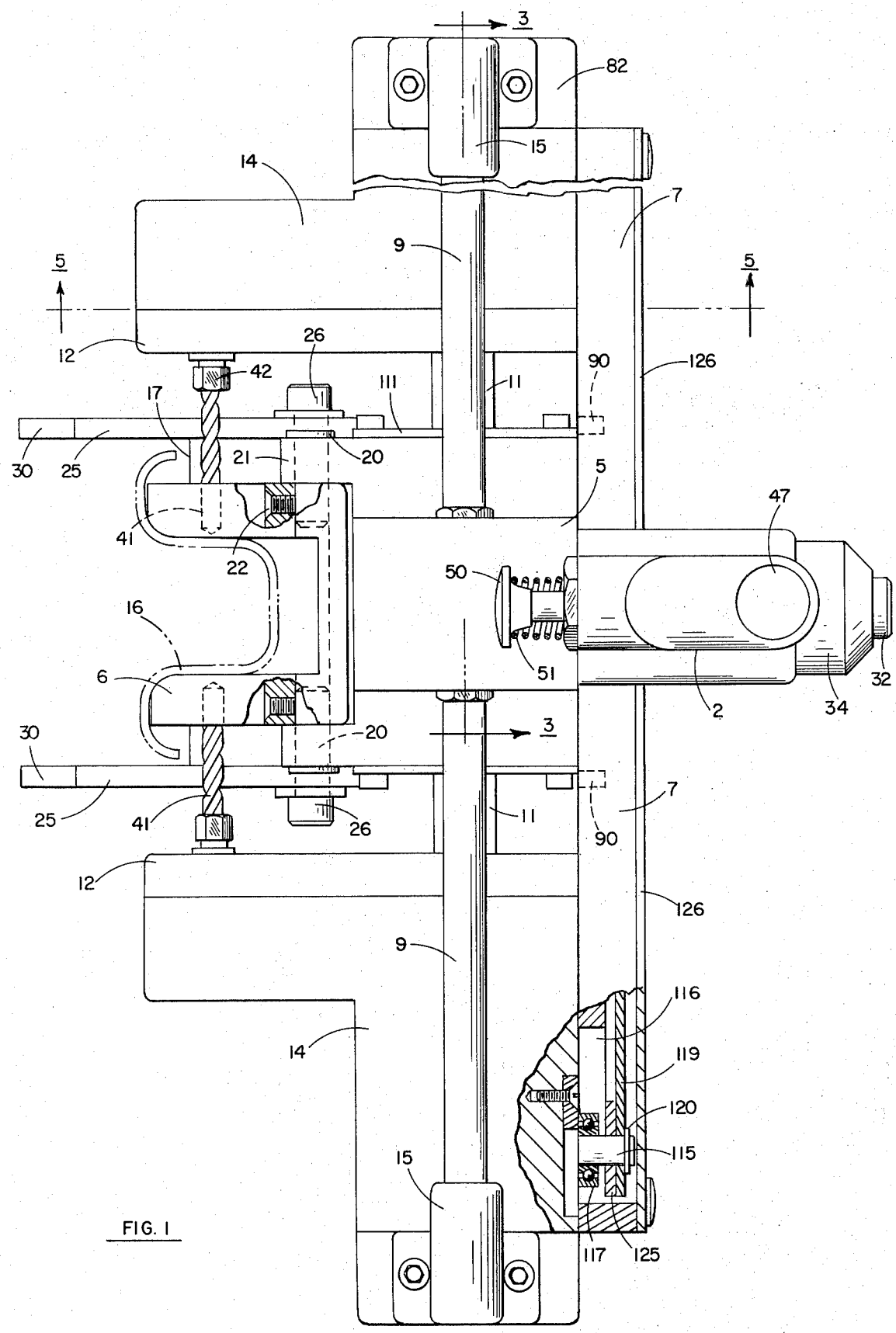
FIG. 1 is a left side elevational view, partly in section, of the present drill tool.

Slidably housed inside a piston chamber 10 in center section 5 to move vertically are two opposed slave piston assemblies 11 (FIG. 3), which are fixed respectively to two spindle cover plates 12 which are in turn fixed to two motor "heads" or housings 14 (FIG. 1). Each motor housing 14 is vertically slidably attached to the forward side of the adapter plate 7. An adapter cylinder 15 on each housing 14 is adapted to slidably receive the motor drive air tubes 9.

Figure 2:
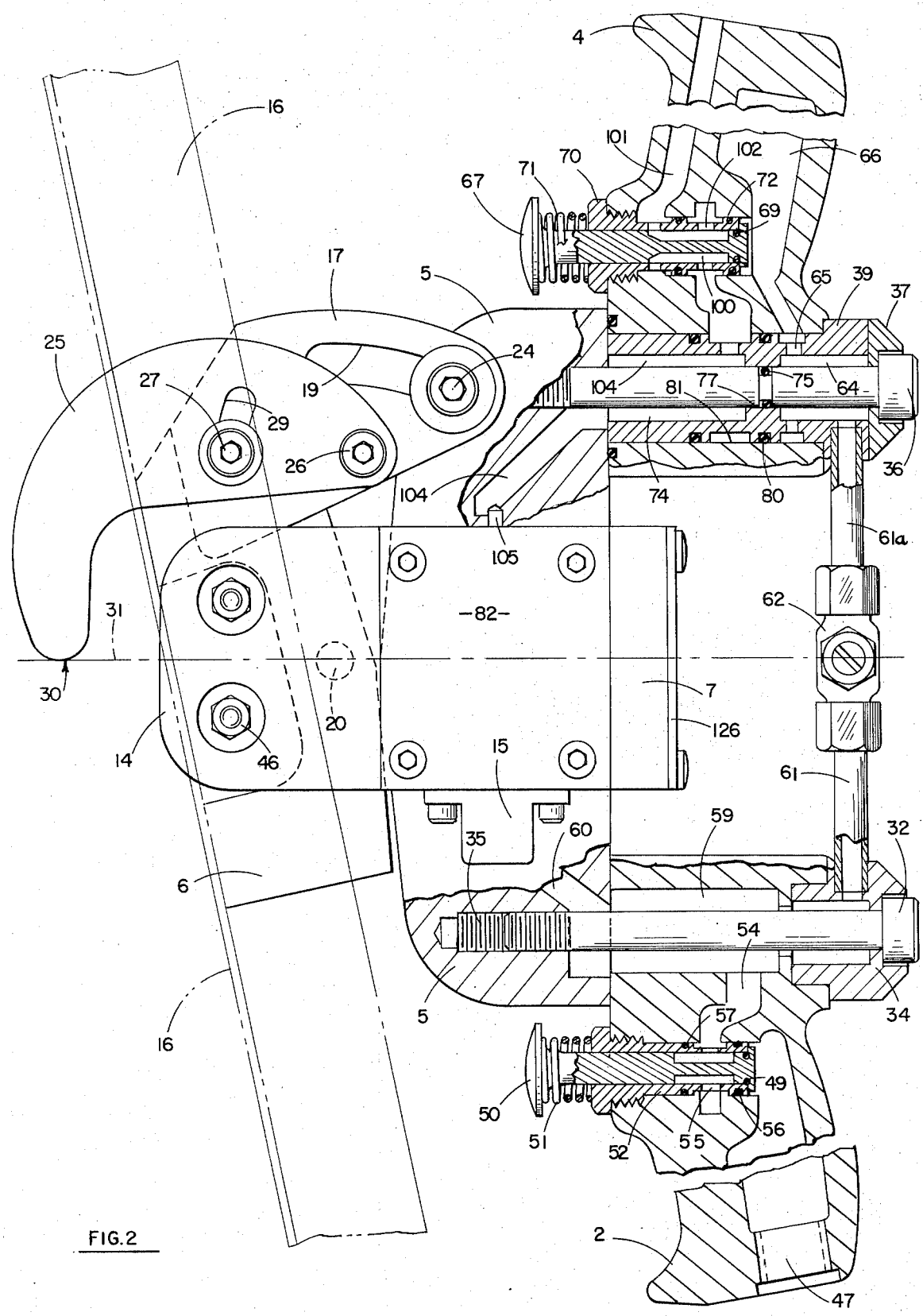
FIG. 2 is a top view, partly in section, of the tool shown in FIG. 1.

Prior to operating the drilling tool, the saddle 6 is positioned to the desired angle with respect to center section 5 as shown in FIG. 2, and saddle 6 straddles a workpiece 16. Saddle 6 is essentially a "U" shaped channel having a cutout center section and two integral vertically spaced arms 17 extended to one side, each arm having a curved elongated cutout 19. Saddle 6 is pivotally attached to center section 5 by two flat head pins 20 (FIGS. 1 and 2) which are inserted through flanges 21 of the center section 5. The flat head pins 20 are held in place by set screws 22 located in the saddle 6. When the desired saddle angle is established, relative to workpiece 16, saddle 6 is locked in position by bolt locking means 24 extending through the cutouts 19 and received in center section 5. It will be noted that when opposite-hand parts are to be drilled with the center-to-center line of the holes at an angle other than parallel to the horizontal center line 1, the tool can be turned 180° (upside down) to drill the opposite-hand part.

Essentially "L" shaped tool center location arms 25 are pivotally attached respectively to the arms 17 by pivot pins 26, and are held in the desired position by locking bolts 27 which extend through adjustment slots 29 in location arms 25 and are received in arms 17. By setting the location arms 25 properly, the drill tool can be automatically positioned laterally by holding so that contact noses 30 of arms 25 rest against some cross member, indicated by line 31, previously assembled to workpiece 16.

The drill speed control handle 2 (FIGS. 2 and 7) is adjusted in height to the angle desired by the operator for his ease of operating by loosening a handle pivot bolt 32 which is slidably received in a handle plug 34 and mates with a threaded hole 35 located in the center section 5. Feed control handle 4 is adjusted to the angle desired by the operator by loosening its pivot bolt 36 which is slidably received in a cap 37 and a spool 39 and mates with another threaded hole (not shown) located in the right-hand side of center section 5. After handles 2 and 4 are adjusted to the desired angle, bolts 32 and 36 are tightened to maintain the angle.

Four conventional drills 41 are detachably held in collets 42 (FIG. 6) which are threaded into collet gears 44. Collets 42 and collet gears 44 are provided with locking tapers 45 which firmly hold drills 41 after collets 42 are tightened into collet gears 44. During this tightening operation, collet gears 44 are prevented from rotating by engaging a box wrench or the like (not shown), with hexagonal ends 46 (FIGS. 2 and 6) provided on the top ends of collet gears 44.

In operation, a compressed air hose (not shown) is attached to an inlet port 47 located in handle 2 (FIG. 2). Air entering inlet port 47 is blocked by an air inlet seal 49 which is held in a groove located on the end of a speed control valve plunger 50. In the normally closed position, a speed control spring 51 holds air inlet seal 49 against a speed control cylinder 52 and prevents air from entering into a handle passage 54.

When the speed valve plunger 50 is pressed in to operating position by the operator, speed control spring 51 is compressed and air inlet seal 49 is forced away from its seat on speed control cylinder 52. Air is then free to enter into the interior of speed control cylinder 52 and is ported through speed control cylinder holes 55 into the handle passage 54. Air is prevented from returning from handle passage 54 into inlet port 47 by means of a speed control cylinder seal 56 and is prevented from escaping to the atmosphere by a speed control handle seal 57.

Air in the handle passage 54 is free to enter into a master air chamber 59, a speed control port 60, the handle plug 34, and an interconnecting tube 61; air in interconnecting tube 61 passes through a conventional adjustable needle valve 62. Air passing through valve 62 is ported through an interconnecting tube 61a and into a feed control chamber 64 located in the feed control spool 39. From feed control chamber 64, air is free to exit through feed holes 65 in spool 39 into a master feed chamber 66 located in the feed control handle 4.

Air is prevented from exiting from master feed chamber 66, when a feed control valve plunger 67 is in its normally released position, by a feed stop seal 69 which is held in a groove provided in one end of the feed control valve plunger 67. The feed stop seal 69 is held against a feed control cylinder 70 by a feed control spring 71. Air is prevented from exiting from around the outside of the feed control cylinder 70 by a master feed chamber seal 72 which is held in a groove provided near one end of the cylinder 70.

Air is prevented from exiting from the feed control chamber 64 into a feed actuator chamber 74 by a bolt seal 75 installed in a bolt groove provided in the pivot bolt 36. The bolt seal 75 is in compressive contact with the inside of a ridge 77 which is an integral part of the feed control spool 39. The outside of ridge 77 is provided with a groove in which a ridge seal 80 is installed in compressive contact with a bore 81 located in the handle 4 to prevent air from entering into the feed actuator chamber 74 from around the outside of feed control spool 39.

Air in the speed control port 60 is free to pass through the motor drive air tubes 9 which are threaded into center section 5 (FIG. 3) and slidably received into adapter cylinders 15. Adapter cylinders 15 are respectively fixed to two motor housing covers 82 which are in turn fixed to the motor housings 14.

Figure 5:
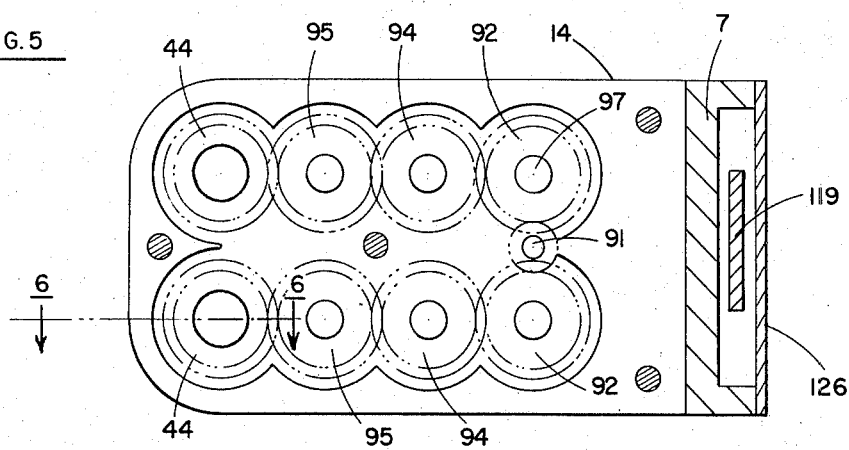
FIG. 5 is a sectional view, taken in accordance with broken line 5—5 of FIG. 1.

External air leakage from adapter cylinders 15 is prevented by a cover seal 84 located in a groove provided in each motor housing cover 82 and by an air tube seal 85 provided in a groove located on the adapter end of each air tube 9. Air is free to exit from the adapter cylinder 15 of each identical motor assembly through a motor drive port 86 into one end of a conventional vane-type air motor 87 which is mounted in motor housing 14. Such air motor need not be described in detail herein, since an example thereof is disclosed in U.S. Pat. No. 2,909,949, issued Oct. 27, 1959. That patent also describes a gearing arrangement for driving two drills from one motor, similar to the present device. Air exits from air motors 87 rearwardly through motor exhaust ports 89 which extend through motor housing 14 and into the interior space in adapter plate 7, as further shown in FIG. 7. The air is then exhausted to the atmosphere forwardly through exit holes 90 located in the forward wall of the adapter plate 7. A drive shaft 91 (FIGS. 3 and 5) projects from each air motor 87 and mates with two drive gears 92, which mate with two first idler gears 94 which in turn mate with two second idler gears 95. These second idler gears 95 mate with the driven collet gears 44 which hold the standard drills 41 during the drilling operation.

Figure 6:
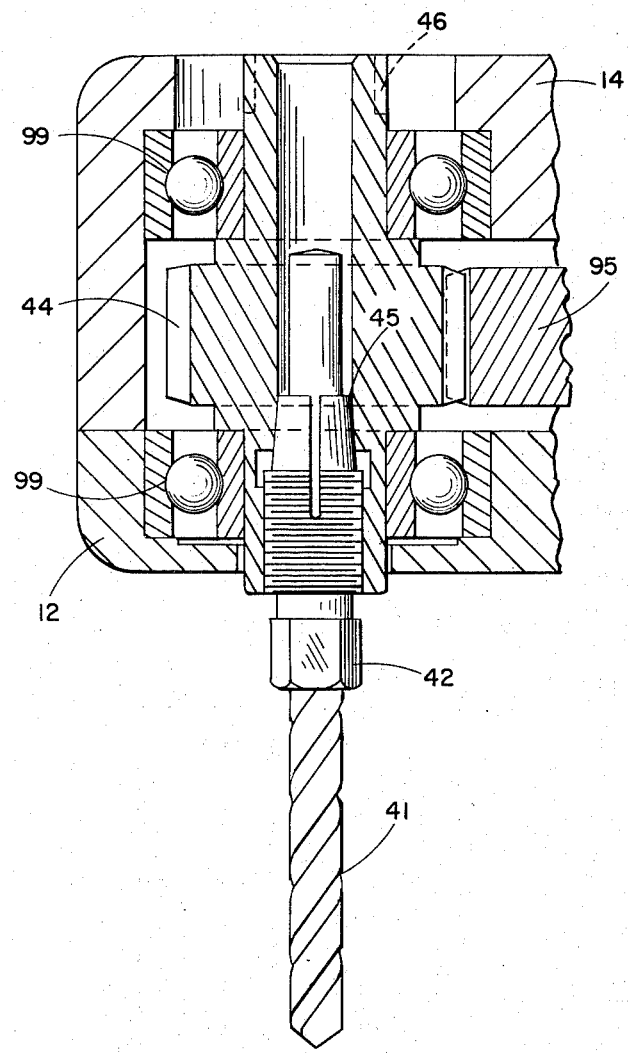
FIG. 6 is a detailed enlarged sectional view taken in accordance with broken line 6—6 of FIG. 5.

Gears 92, 94, and 95 are pressed on individual bearings 96 which are slip-fit over pins 97 which are in turn held in the motor housings 14 by a press fit, while collet gears 44 are each rotatably held in motor housings 14 by two collet bearings 99 (FIG. 6).

Referring again to FIG. 2, while the speed control valve plunger 50 is held in the open position to rotate the drills, then the feed control valve plunger 67 is pressed by the operator to advance the drills into the work. When the plunger 67 is moved to its operating position, acting against feed spring 71, this action unseats the feed stop seal 69 and permits air under pressure in master feed chamber 66 to enter into a plunger chamber 100. At this same time, inward movement of plunger 67 blocks off air in plunger chamber 100 from entering an exhaust port 101. The air in chamber 100 passses through cylinder holes 102 provided in feed control cylinder 70 and into a feed operating space 104. The air then is split into two feed passages 105 (FIG. 3) and into each of the piston chambers 10 to urge slave piston assemblies 11 toward the center line 1 of center section 5, compressing a piston spring 106 from each end thereof and pulling the motor housings 14 toward each other to effect the drilling operation.

Air trapped between slave piston assemblies 11 is exhausted rearwardly through holes 107 leading through the rear of center section 5 and through the forward wall of adapter plate 7, and from there to the atmosphere through the forward exit holes 90 in adapter plate 7. Air in piston chambers 10 is prevented from escaping to the atmosphere by an interior seal 109 housed in a groove located in a piston rod hole 110 provided through the center of one of two caps 111, and by an exterior seal 112 housed in a groove located on the outside edge of cap 111. Air is prevented from leaking past pistons 11 into the center section 5 by a piston seal 114 located in a groove provided near the face of each piston assembly 11.

Uniform feed motion of both motor housings 14 is mechanically maintained by the following parts acting in combination: housing pins 115 (FIGS. 1 and 7) which are fixed to motor housings 14 and extended through vertical slots 116 located in adapter plate 7, by pin bearings 117 fitted over housing pins 115, which bearings are free to roll in the slots 116, by two linkage arms 119 which are free fit over housing pins 115 and held in place by standard retainer rings 120, and by a pivot arm 121 which is pivotally attached to adapter plate 7 by an anchor pin 122, which pivot arm 121 is pivotally attached at respective ends thereof to the linkage arms 119 by linkage pins 124. These parts acting together assure synchronous pulling motion of motor housings 14. Another important element is a flat bearing washer 125 which fits over pin 115 just behind linkage arms 119. These washers 125 bear on the material of adapter plate 7 immediately surrounding the slots 116, and mechanically retain the motor housings 14 against the forward side of plate 7 during the sliding motion. The rate of feed of the motor housings and drills is regulated by adjustment of the needle valve 62. A cover 126 is removably attached to adapter plate 7 to protect the operator from moving linkages and to direct exhausting air from air motors 87 and center section 5 through the forward exit holes 90.

When the feed control valve plunger 67 is released, feed control spring 71 urges the seating of feed stop seal 69 and opens exhaust port 101 to the feed operating space 104. Air trapped in piston chambers 10 is then free to exit back through feed passages 105 and feed operating space 104 through feed control cylinder 70 and is exhausted to atmosphere through exhaust port 101; piston spring 106 urges piston assemblies 11 to exert a retracting force on motor housings 14, backing drills 41 from the workpiece 16. When the speed control valve plunger 50 is released, speed control spring 51 urges the seating of air inlet seal 49, stopping motor rotation and all air flow and functions of this drilling tool.

Although one preferred embodiment of the invention has been described in detail, it will be understood that many variations can be incorporated into the basic invention. For example, the drilling device can be modified so that one operating valve can operate the drilling device; this can be accomplished by blocking off the master air chamber 59 from interconnecting tube 61 and porting air from speed control port 60 directly to the feed operating space 104 and providing for exhaust from pistons 11 when they retract. However, the use of one operating valve button per hand acts as a safety feature to keep both the operator's hands out of danger from the drills. Further, it is obvious that more drill heads could be added to provide more hole combinations.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

We claim:

1. A hand held dual-direction drilling device comprising:
   a. a center section having a fluid cylinder therein open at both ends;
   b. a pair of drill motor housings slidably mounted on said center section along a common line and a rotatable fluid drill motor in each of said housings
   c. a piston fixedly attached to each of said motor housings and respectively operating in opposite ends of said cylinder;
   d. a handle attached to said center section;
   e. a valve operating member in said handle;
   f. fluid valve means connected to said valve operating member;
   g. first fluid passage means from said valve means to said drill motor housings for receiving fluid means to operate said drill motors and
   h. second fluid passage means from said valve means to said cylinder for receiving fluid means to drive said pistons and motor housings toward each other.

2. Apparatus in accordance with claim 1 including a second handle, handle attaching means connecting said handles to opposite respective sides of said center section with the handles extending outward from said center section in the left and right directions respectively, said handle attaching means comprising pivot bolt means for allowing pivotal adjustment of said handles in an upward or downward direction relative to said center section.

3. A dual-direction drilling device comprising:
   a. a pair of drill motor housings each having a rotatable fluid drill motor;
   b. a central mounting structure containing a master cylinder, said mounting structure having means carrying said motor housings for linear motion along the axis of rotation of said drill motors with respect to said mounting structure;
   c. a pair of slave pistons attached respectively to said motor housings and operating in said master cylinder to move each motor housing along said axis of rotation in response to pressure on said pistons, said motors being positioned in line facing each other in opposite drill-advancing directions and spaced apart a sufficient distance to clear two spaced work elements to be drilled;
   d. an air supply inlet to said mounting structure;
   e. manually-operated valve means in said mounting structure communicating with said air supply inlet;
   f. first air pressure passage means connected between said valve means and said rotatable drill motors; and
   g. second air pressure passage means connected between said valve means and said master cylinder.

4. Apparatus in accordance with claim 3 including:
   a. first air exhaust means from said rotatable drill motors to the atmosphere; and
   b. second air exhaust means from said master cylinder to the atmosphere.

5. Apparatus in accordance with claim 3 wherein:
   a. said second air pressure passage means is connected to opposite ends of said cylinder beyond said pistons for urging said pistons toward each other simultaneously, when said valve means is operated, and including;
   b. piston return means for separating said pistons when said valve means is not operated.

6. Apparatus in accordance with claim 3 including means operatively connecting two parallel rotatable motor-driven drill holders to each of said drill motors, said drill holders of each motor respectively aligned with and pointing toward the drill holders of the other motor.

7. Apparatus in accordance with claim 3 including:
   a. a saddle member pivotally connected to said central mounting structure about a pivot axis parallel to the axes of rotation of said drill motors, said saddle having channel means formed to straddle the work elements to be drilled from opposite sides thereof; and
   b. saddle position locking means for holding said saddle at a desired pivoted position with respect to said central mounting structure.

8. Apparatus in accordance with claim 3 including:
   a. a drill location member pivotally connected to said central mounting structure about a pivot axis substantially parallel to the axes of rotation of said drill motors, said location member having an extended nose portion projecting laterally of said drilling device beyond said motors toward said work elements; and b. location member locking means for holding said location member at a desired position with respect to said mounting structure, whereby said drilling device can be automatically laterally positioned with respect to said work elements with said nose portion in contact with the side of a work-element related part.

* * * * *